US012602380B2

(12) United States Patent
Ahmed et al.

(10) Patent No.: US 12,602,380 B2
(45) Date of Patent: Apr. 14, 2026

(54) SUBSUMPTION OF VIEWS AND SUBQUERIES

(71) Applicant: ORACLE INTERNATIONAL CORPORATION, Redwood Shores, CA (US)

(72) Inventors: Rafi Ahmed, Fremont, CA (US); Mohamed Ziauddin, Pleasanton, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 249 days.

(21) Appl. No.: 17/380,905

(22) Filed: Jul. 20, 2021

(65) Prior Publication Data

US 2023/0024553 A1 Jan. 26, 2023

(51) Int. Cl.
*G06F 16/2453* (2019.01)
(52) U.S. Cl.
CPC .............................. *G06F 16/24535* (2019.01)
(58) Field of Classification Search
CPC ........... G06F 16/24535; G06F 16/2453; G06F 16/2454
See application file for complete search history.

(56) References Cited

U.S. PATENT DOCUMENTS 5,742,806 A * 4/1998 Reiner .............. G06F 16/24532
707/999.002
6,826,562 B1 * 11/2004 Leung .............. G06F 16/24535
707/999.002

7,693,820 B2 * 4/2010 Larson .............. G06F 16/24539
707/999.002
8,521,723 B1 * 8/2013 Ahmed .............. G06F 16/24534
707/802
9,183,254 B1 * 11/2015 Cole ................... G06F 16/2453
2004/0153448 A1 * 8/2004 Cheng .............. G06F 16/24535
2007/0130115 A1 6/2007 Au (Continued)

OTHER PUBLICATIONS

Oxford Languages Dictionary; "Definition of 'that'"; Printed Jul. 12, 2023 (Year: 2023).*

(Continued)

*Primary Examiner* — Amanda L Willis
(74) *Attorney, Agent, or Firm* — Hickman Becker Bingham Ledesma LLP

(57) ABSTRACT

Techniques for subsumption of inline views and subqueries in a query are described. An optimization technique of subsumption is enabled by inline views having identical tables and identical join conditions and having aggregation functions but no group-by clauses. When subsumption takes place, a single query block replaces the inline views (or subqueries) with a single inline view query block. Subsumption reduces multiple access to the same table and multiple evaluations of the same join conditions required to evaluate the query. The single query block includes factored out filter predicates and unified predicates that originate from the subsumed inline views (or subqueries). Based on similarities among the aggregation functions and filter predicates in the subsumed inline views, pre-computation of common aggregates may be performed in a new group-by view in the subsuming view.

14 Claims, 5 Drawing Sheets

(56) References Cited

U.S. PATENT DOCUMENTS

2009/0292669 A1    11/2009    Ahmed

OTHER PUBLICATIONS

W3resource; Understanding Sql subqueries; Print out pp. 1-3; Dated Jun. 21, 2011; https://www.w3resource.com/sql/subqueries/understanding-sql-subqueries.php (Year: 2011).*

Julia L. McMillan; "Identifying and Addressing Unclear Pronouns & Antecedents"; Writting Commons.org; https://writingcommons.org/article/identifying-and-addressing-unclear-pronouns-antecedents/#Practice_Solving_unclear_antecedents_due_to_multiple_possible_antecedents; Printed May 22, 2024; 12 pages (Year: 2024).*

Wikipedia "Antecedent (grammar)"; https://en.wikipedia.org/wiki/Antecedent_(grammar); Printed May 22, 2024; 4 Pages (Year: 2024).*

Halevy et al., "Answering Queries Using Views: A Survey", The VLDB Journal, vol. 10, No. 4, dated Dec. 1, 2001, 25 pgs.

Current Claims in Application No. PCT/US2022/033750, dated Sep. 2022, 3 pages.

Cohen, Sarah, "User-Defined Aggregate Functions: Bridging Theory and Practice", Proceedings of the International Conference on Management of Data, Jun. 2006, 12 pages.

* cited by examiner

100

300

302 Identify an outer query block in the query

304 Do inline views or subqueries in the outer query block pass a conditions check?

No → 314 End

Yes

306 Replace the inline views or subqueries in the query block with a subsuming view 308 Does grouping pass a heuristic check?

No

Yes

310 Create a new group-by view in the subsuming view

312 Execute resulting query

SUBSUMPTION OF VIEWS AND SUBQUERIES

FIELD OF THE INVENTION

The present invention relates to database systems and, in particular, to optimization of queries executed by a database system.

BACKGROUND

Relational and object-relational database management systems store information in tables of rows in a database. To retrieve data, queries that request data are submitted to a database server, which computes the queries and returns the data requested from the database. Query statements submitted to the database server should conform to the syntactical rules of a particular query language. One popular query language, known as the Structured Query Language (SQL), provides users a variety of ways to specify information to be retrieved.

A query that is submitted to a database server is analyzed by a query optimizer. Based on the analysis, the query optimizer generates an execution plan optimized for efficient execution of the query. The optimized execution plan may be based on a rewrite of the query.

Many times, when a query includes multiple inline views or subqueries that access the same tables and have the same join conditions, these inline views and subqueries are evaluated individually. However, evaluation of these kinds of inline views and subqueries on an individual basis is inefficient because doing so results in redundant access of the same tables and redundant performance of the same join evaluations.

It is thus desirable to develop techniques for rewriting queries that have multiple inline views or subqueries accessing the same tables and using the same join conditions, to reduce redundant accesses of the same tables and redundant join evaluations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DETAILED DESCRIPTION

Figure 1:
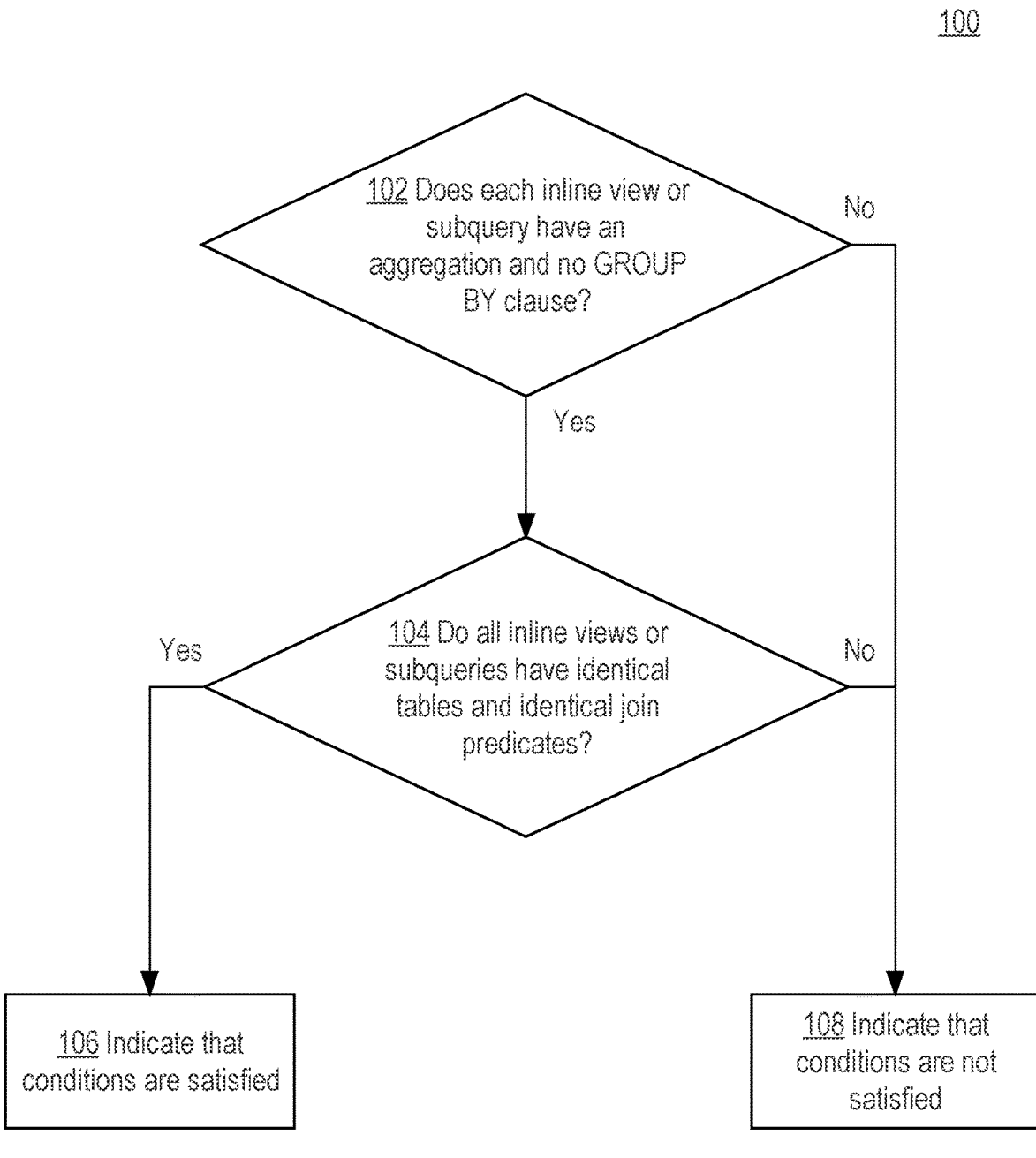
FIG. 1 depicts a flowchart for a database management system to assess whether subsumption conditions are satisfied.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for subsumption of inline views and select-list subqueries in a query. The described optimization technique of subsumption operates on inline views that have the same tables and join conditions and that have aggregation functions but no group-by clauses. In subsumption, a single query block replaces multiple inline views with a single inline view query block. The rules for subsumption given here apply equally to subqueries.

In order to perform subsumption, each inline view or subquery in a query must return one row containing an aggregation column. It should be noted that since each inline view or subquery returns one row, the join between the inline views returns as most one row.

Subsumption reduces multiple access to the same table and multiple evaluations of the same join conditions required to evaluate the query. The single query block, which is referred to herein as the subsuming view because it replaces the subsumed inline views (or subqueries), includes factored out filter predicates and unified predicates. Factored out filter predicates and unified predicates are filter predicates that originate from the subsumed inline views (or subqueries). Factored out filter predicates and unified predicates make joins and aggregations more efficient in the subsuming view as they reduce the number of rows produced before joins and aggregations are performed. Based on similarities among the aggregation functions and filter predicates in the subsumed inline views, pre-computation of common aggregates may be performed in a new group-by view in the subsuming view, which may make aggregation even more efficient.

Queries containing multiple views or subqueries are quite common in many benchmarks and customer workloads. For example, experiments involving the optimization technique described herein resulted in a more than four times performance gain.

Definitions

A query may include an outer query block and zero or more inner query blocks in the body of the outer query block. An inner query block that appears in a FROM clause of a query is referred herein as an inline view. An inner query block that appears in a WHERE, SELECT, or HAVING clause of a query is referred herein as a subquery. Techniques described herein relate to subsumption of multiple inline views and select-list subqueries. When subsumption takes place, a subsuming view replaces the subsumed inline views or subqueries.

Factorization is a technique that removes common filter predicates in the subsumed inline views or subqueries and adds the common filter predicates to a WHERE clause in the subsuming view.

Unification is a technique that combines similar filter predicates originating from the subsumed inline views or subqueries (e.g., filter predicates that differ in literal values), into a disjunctive filter predicate or a range filter predicate and adds the disjunctive filter predicate or the range filter predicate to the subsuming view. For example, if view V1 has filter predicate T1.x=7, view V2 has filter predicate T2.y>9, and view V3 has filter predicate T1.z=15, then the filter predicates are combined into disjunctive filter predicate (T1.x=7 OR T2.y>9 or T1.z=15), which is added in the subsuming view.

Factorization and unification each results in making joins and aggregations in the subsuming view more efficient.

Subsumption Conditions

Inline views or subqueries in a query must satisfy several "subsumption conditions" in order to perform subsumption in the query. FIG. 1 depicts a flowchart 100 for a database management system (DBMS) to assess whether the several subsumption conditions are satisfied. At step 102 of flowchart 100, it is determined whether each inline view or subquery of an outer query block has an aggregation and no GROUP BY clause. Importantly, step 102 in essence determines whether execution of each inline view or subquery produces exactly one row.

If it is determined, at step 102, that each inline view or subquery does not have an aggregation or has a GROUP BY clause, then subsumption would not be appropriate and is indicted as such, at step 108. Otherwise, if it is determined, at step 102, that each inline view or subquery has an aggregation and has no GROUP BY clause, then at step 104, it is determined whether all inline views or subqueries have identical tables and identical join conditions. It is noted that if there is only a single table, then there would be no join conditions.

If it is determined, at step 104, that the inline views or subqueries do not have identical tables or do not have identical join conditions, then subsumption would not be appropriate and is indicted as such, at step 108. Otherwise, if it is determined, at step 104, that all inline views or subqueries have identical tables and have identical join conditions, then subsumption would be appropriate and is indicated as such, at step 106.

For example, consider the following original query Q1A:

```
Q1A SELECT *
    FROM (SELECT AVG(F.x) AV
    FROM F, D1
    WHERE F.a=D1.a and
        F.c=5 and
        F.g=69) V1,
    (SELECT SUM(F.y) SM
        FROM F, D1
        WHERE F.a=D1.a and
        F.c=5 and
        F.g=40) V2,
    (SELECT COUNT(F.z) CN
    FROM F, D1
    WHERE F.a=D1.a and
        F.c=5 and
        F.g=2 and
        D1.m>8) V3;
```

The three inline views, V1, V2, and V3, in query Q1A satisfy the conditions for subsumption. Particularly, each inline view has an aggregation function; the view V1 has an AVG aggregation function, the view V2 has a SUM aggregation function, and the view V3 has a COUNT aggregation function. Each inline view does not have a GROUP BY clause. Moreover, the inline views have identical tables (e.g., F, D1) and have an identical join condition (e.g., F.a=D1.a). Since all subsumption conditions are satisfied, subsumption would be valid, and the three views can be subsumed into one subsuming view, as shown in rewritten query Q1B in the Subsumption Formation section below.

For another example, consider the following original query Q2A:

```
Q2A SELECT (SELECT SUM(F.x)
    FROM F
    WHERE F.c between 1 and 5) SM1,
    (SELECT AVG(F.x)
    FROM F
    WHERE F.c between 6 and 10) AV,
    (SELECT COUNT(F.x)
    FROM F
    WHERE F.c between 11 and 15) CN,
    (SELECT SUM(F.x)
    FROM F
    WHERE F.c between 16 and 20) SM2
    FROM T
    WHERE T.k=1;
```

The four SELECT clause subqueries, SM1, AV, CN, SM2, in Q2A satisfy the subsumption conditions. Particularly, each subquery has an aggregation function; the subquery SM1 has a SUM aggregation function, the subquery AV has an AVG aggregation function, the subquery CN has a COUNT aggregation function, and the subquery SM2 has a SUM aggregation function. Each subquery does not have a GROUP BY clause. Further, the subqueries have an identical table (e.g., F). There is no join condition as there only one table that is referenced. Since all subsumption conditions are satisfied, subsumption would be valid, and the four subqueries can be subsumed into one subsuming view, as shown in rewritten query Q2B in the Subsumption Formation section below.

Subsumption Formation

Once a DBMS determines that inline views or subqueries satisfy subsumption conditions, the query may be rewritten by performing subsumption. When the subsumption conditions are satisfied, inline views or subqueries may be replaced with a single subsuming view. The subsuming view is created in an outer query block.

The subsuming view contains the tables and join conditions of the subsumed views or subqueries. Any common filter predicates from the subsumed inline views or subqueries are factored out and added to a WHERE clause of the subsuming view. Filter predicates belonging to the subsumed inline views or subqueries are unified in a disjunctive filter predicate or a range filter predicate that is added to the subsuming view.

In addition, a CASE statement for each SELECT item of each subsumed inline view or subquery may be created in the subsuming view to account for the differences in the filter predicates. Each SELECT item is an aggregation that was returned by an inline view or subquery in the original query. For example, in Q1A, the SELECT items are the aggregations with the labels AV, SM, and CN.

Each CASE statement encapsulates the WHERE clause filter predicates (e.g., non-factored filter predicates) as well as the SELECT item aggregation function in the SELECT item corresponding to that CASE statement. The subsumed inline views or subqueries are removed.

Subsumption is described by illustrating subsumption on queries Q1A and Q2A introduced above. As explained above, queries Q1A and Q2A satisfy subsumption conditions.

By applying subsumption, original query Q1A may be rewritten as query Q1B.

Q1B SELECT *
    FROM (SELECT AVG(CASE WHEN F.g=69
    THEN F.x ELSE NULL END) AV,
    SUM(CASE WHEN F.g=40
    THEN F.y ELSE NULL END) SM,
    COUNT(CASE WHEN F.g=2 and D1.m>8
    THEN F.z ELSE NULL END) CN
    FROM F, D1
    WHERE F.a=D1.a and
        F.c=5 and/* factored */
        F.g IN (69, 40, 2) /* unified */
    ) SV;
A subsuming view SV is introduced in query Q1B. The three inline views, V1, V2, and V3, in the outer query block (e.g., FROM clause) of query Q1A are subsumed by the subsuming view SV. The same join condition F.a=D1.a is placed in the WHERE clause of the subsuming view SV. The filter predicate F.c=5, which are common to all three subsumed views, V1, V2, and V3, is factored out and is placed in the WHERE clause of the subsuming view SV. The three filter predicates F.g=69, F.g=40, and F.g=2, are unified as F.g IN (69, 40, 2) and placed in the subsuming view SV. A CASE statement for the SELECT item of each of the subsumed view is created in the subsuming view SV. A CASE statement includes a WHEN-THEN condition based on a corresponding WHERE clause non-factored filter predicate (e.g., F.g=69, F.g=40, F.g=2) and also includes a corresponding aggregation function. In addition, each non-factored and non-unified filter predicate (e.g., D1.m>8) also appears in its corresponding CASE statement. The subsuming view SV of query Q1B also returns a single row, as in the original query Q1A.

In another example, original query Q2A may be rewritten as query Q2B.

Q2B SELECT *
    FROM (SELECT SUM(CASE WHEN F.c between 1 and 5
    THEN F.x ELSE NULL END) SM1,
    AVG(CASE WHEN F.c between 6 and 10
    THEN F.x ELSE NULL END) AV,
    COUNT(CASE WHEN F.c between 11 and 15
    THEN F.x ELSE NULL END) CN,
    SUM(CASE WHEN F.c between 16 and 20
    THEN F.x ELSE NULL END) SM2
    FROM F
    WHERE F.C between 1 and 20 /* range unification */
    ) SV, T
    WHERE T.k=1;
A subsuming view SV is introduced in query Q2B. The four subqueries, SM1, AV, CN, SM2, in the outer query block (e.g., SELECT clause) of query Q2A are subsumed by the subsuming view SV. No filter predicates are factored out. However, the four filter predicates F.c between 1 and 5, F.c between 6 and 10, F.c between 11 and 15, and F.c between 16 and 20, are unified as a single range filter predicate F.C between 1 and 20 and placed in the subsuming view SV. A CASE statement for the SELECT item of each of the subsumed subqueries is created in the subsuming view SV. A CASE statement includes a WHEN-THEN condition based on a corresponding WHERE clause non-factored filter predicate (e.g., F.c between 1 and 5, F.c between 6 and 10, F.c between 11 and 15, F.c between 16 and 20) and also includes a corresponding aggregation function. The subsuming view SV of query Q2B also returns a single row, as in the original query Q2A.

In both rewritten queries Q1B and Q2B, partitioning of the underlying set of rows is performed after join conditions evaluated and filter predicates are performed. Rewritten queries Q1B and Q2B, thus, improve query performance over the original queries by reducing table accesses and joins. However, depending on whether there are similarities among various aggregation functions and filter predicates in a subsumed view, further optimizations may be achieved by performing grouping and pre-computation of common aggregates, as discussed below.

Grouping and Pre-Computation

Grouping and pre-computation of common aggregates are further optimizations that may be implemented to make aggregations even more efficient.

Grouping is a technique that creates a group-by view, in the subsuming view, that contains (1) tables, join conditions, and filter predicates of the subsuming view, and (2) a GROUP BY clause containing column(s) referenced in the filter predicates of CASE statement WHEN clauses of the subsuming view. However, grouping is an expensive operation. It should be determined that the cost benefit of grouping outweighs the cost associated with this operation.

Pre-computation of aggregations is a technique where aggregations are computed in a newly-introduced group-by view. Grouping and pre-computation of aggregations result in a smaller query block and aggregations that can be processed more efficiently when in the subsuming view.

Grouping and pre-computation may be performed in a new group-by view in a subsuming view. Since grouping is an expensive operation, a decision to perform grouping may be determined based on, for example, evaluating heuristics prior to grouping.

Figure 2:
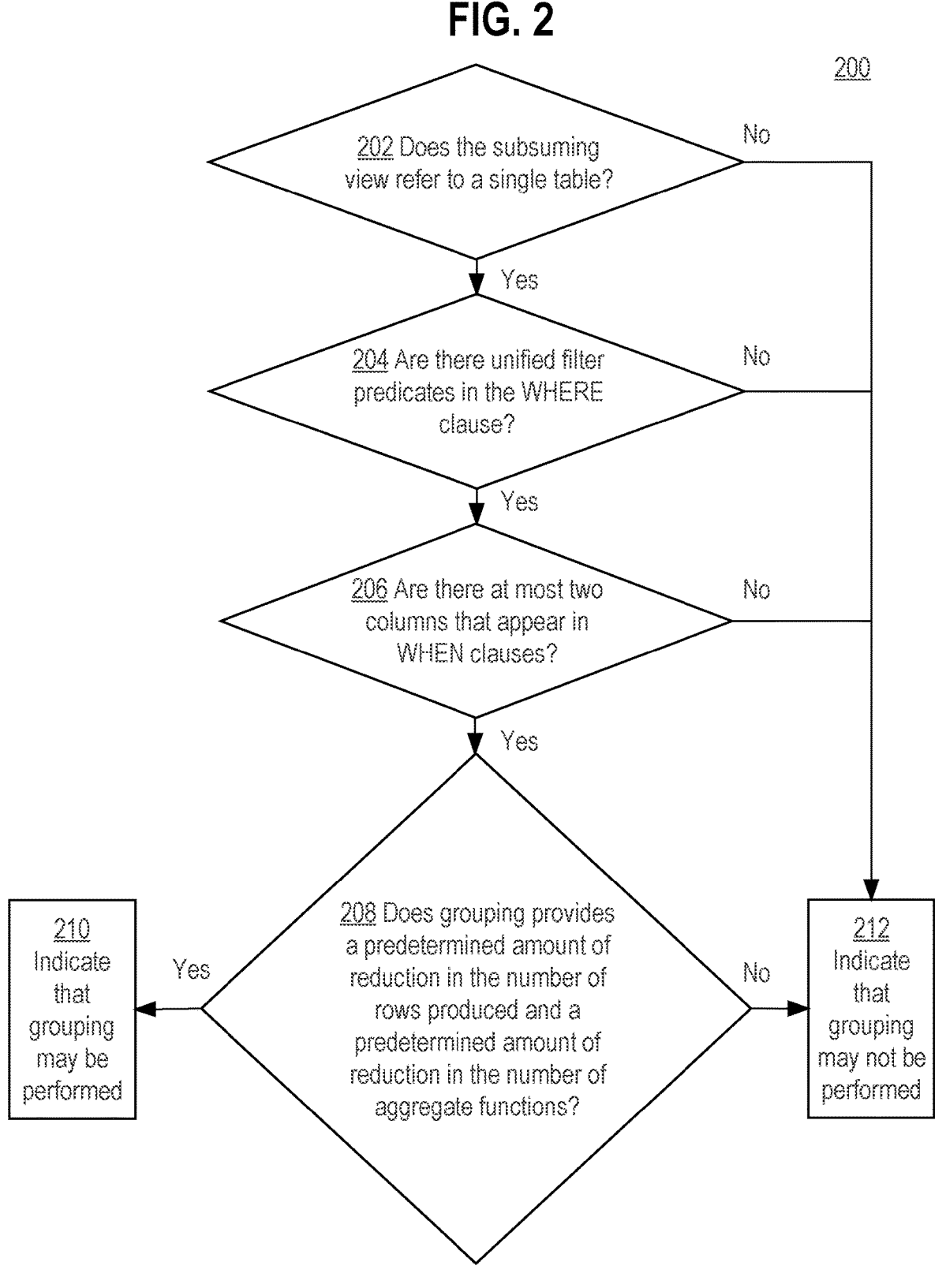
FIG. 2 depicts a flowchart for a database management system to assess whether grouping and pre-computation may be performed.

FIG. 2 depicts a flowchart 200 for a DBMS to assess whether grouping and pre-computation may be performed. At step 202 of flowchart 200, it is determined whether a subsuming view refers to a single table.

If it is determined, at step 202, that the subsuming view does not refer to a single table, then grouping and pre-computation would not be appropriate and is indicated as such, at step 212. Otherwise, if it is determined, at step 202, that the subsuming view does refer to a single table, then at step 204, it is determined whether there are unified predicates in the WHERE clause of the subsuming view.

If it is determined, at step 204, that there are no unified predicates in the WHERE clause of the subsuming view, then grouping and pre-computation would not be appropriate and is indicted as such, at step 212. Otherwise, if it is determined, at step 204, that there are unified predicates in the WHERE clause of the subsuming view, then at step 206, it is determined whether there are at most two columns (e.g., T.B and T.C) that appear in the WHEN clauses of the CASE statements, which implies that these columns will appear in a group-by clause of the subsuming view.

If it is determined, at step 206, that there are more than two columns that appear in the WHEN clauses of the CASE statements, then grouping and pre-computation would not be appropriate and is indicted as such, at step 212. Otherwise, if it is determined, at step 206, that there are at most two columns that appear in the WHEN clauses of the CASE statements, then at step 208, it is determined whether grouping provides a predetermined amount of reduction in the number of rows produced (e.g., 1000× reduction) and a predetermined amount of reduction in the number of aggregation functions (e.g., 2× reduction).

In an embodiment, the grouping provides a predetermined amount of reduction in the number of aggregated function when the number of aggregate functions in the group-by view is less or equal to half of the number of aggregate functions in the subsuming view.

In an embodiment, the determination of whether the grouping provides a predetermined amount of reduction in the number of rows produced may be based on the following inequality: $NDV(T.B)*((B2-B1)/(Max(T.B)-Min(T.B)))*NDV(T.C)*((C2-C1)/(Max(T.C)-Min(T.C)))<Cardinality(T)/GRF$, where B1 and B2 are the minimum and maximum values of column T.B, and C1 and C2 are the minimum and maximum values of column T.C in the unified range filter predicates in the WHERE clause of the subsuming view, and where Max(T.B), Min(T.B), Max (T.C), and Min(T.C) are maximum and minimum values of columns T.B and T.C, respectively, in table T. NDV is the number of distinct values. GRF is a configurable grouping reduction factor, which may be set to 1000, for example. The maximum and minimum values of columns T.B and T.C and the NDV can be determined by accessing statistics for Table T for evaluating the inequality. This inequality indicates whether a scaled number of distinct values produced by a group-by view is significantly less (e.g., 1000× less) than the number of distinct values in table T to perform the grouping.

If the unified filter predicate for a column is an IN-list predicate, then the expression for the column on the left hand side of the inequality may be replaced with the count of items in the IN-list for that column.

The inequality used in step 208 and the number of columns determined in step 206 may be extended to the number of columns that appear in the WHEN clauses of the CASE statements.

If it is determined, at step 208, that the reduction from grouping is relatively small, then grouping and pre-computation would not be appropriate and is indicted as such, at step 212. Otherwise, if it is determined, at step 208, that the reduction from grouping is high enough, then grouping and pre-computation would be appropriate and is indicted as such, at step 210.

In an embodiment, grouping and pre-computation are performed only if the conditions described above are satisfied. This heuristic ensures that the grouping provides a 1000× reduction in the number of rows produced by the group-by view and at least 2× reduction in its aggregation functions. Since grouping is an expensive operation, the group-by view will not be created when the benefit of grouping is marginal or negative.

If a heuristic for grouping and pre-computation, such as that described with regards to flowchart 200, passes, then a group-by view is created in the subsuming view, in which the group-by view includes the tables, joins, and filter predicates of the subsuming view, and a GROUP BY clause containing the column(s) referenced in the filter predicates of CASE statement WHEN clauses of the subsuming view. One or more aggregations may be included in the group-by view such that these aggregations are pre-computed.

For example, consider query Q2B discussed above. The query Q2B satisfies the conditions for grouping and pre-computation. In particular, the subsuming view SV refers to a single table (e.g., F). There is a unified filter predicate (e.g., F.c between 1 and 20) in the WHERE clause of the subsuming view SV. There is only one column (e.g., F.c) that appears in the WHEN clauses of the CASE statements, and the four aggregation functions in the CASE statements are defined over that column. A group-by view, if created, would contain at most 20 rows, and there would be two aggregation functions in the group-by view, which is no more than half the number of aggregation functions in the subsuming view SV. Since the conditions for grouping and pre-computation are satisfied, rewritten query Q2B may be further optimized as query Q2C.

```
Q2C SELECT *
  FROM (SELECT SUM(CASE WHEN GV.c between 1
and 5
    THEN GV.VSM ELSE NULL END) SM1,
    SUM(CASE WHEN GV.c between 6 and 10
    THEN GV.VSM ELSE NULL END) /
    SUM(CASE WHEN GV.c between 6 and 10
    THEN GV.VCN ELSE NULL END) AV,
    SUM(CASE WHEN GV.c between 11 and 15
    THEN GV.VCN ELSE NULL END) CN,
    SUM(CASE WHEN GV.c between 16 and 20
    THEN GV.VSM ELSE NULL END) SM2
    FROM (SELECT SUM(F.x) VSM, COUNT(F.x) VCN,
      F.C
    FROM F
    WHERE F.c between 1 and 20 /* range unification */
    GROUP BY F.c) GV
  ) SV, T
  WHERE T.k=1;
```

In query Q2C, a group-by view GV is created in the subsuming view SV. The group-by view GV contains table F, filter predicate F.c between 1 and 20 of the subsuming view SV, and a GROUP BY clause that includes column F.c that was referenced in the filter predicates of the CASE statement WHEN clauses of the subsuming view SV. The group-by view GV also contains SUM and COUNT aggregation functions such that they are pre-computed. The AVG aggregation function is expressed using the SUM and COUNT aggregation functions (e.g., SUM divided by COUNT) because of the pre-computation of aggregates.

Execution of rewritten query Q2C is more efficient than execution of original query Q2A because rewritten Q2C requires less table accesses than original query Q2A. Execution of rewritten query Q2C is more efficient than execution of rewritten query Q2B because the pre-computation of aggregation functions make aggregation more efficient. Although rewritten query Q2C involves grouping, the heuristic ensures that the benefit from the grouping outweighs the cost associated with this expensive operation.

Query Transformation Flow Example

Figure 3:
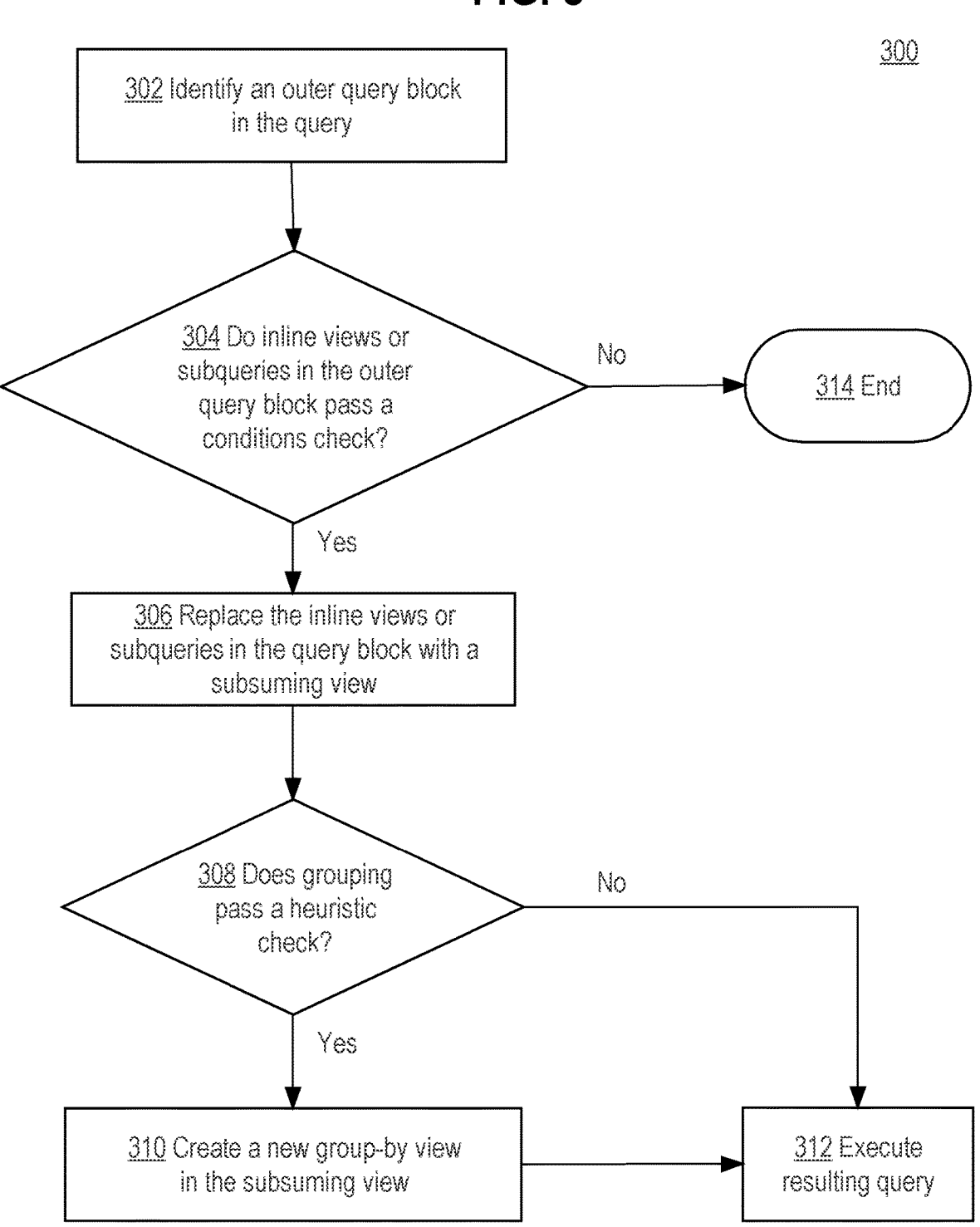
FIG. 3 depicts a flowchart for query transformation.

FIG. 3 depicts a flowchart 300 for query transformation. At step 302, an outer query block in a query is identified.

At step 304, it is determined whether inline views or subqueries in the outer query block pass a subsumption conditions check. The determination made at 304 indicates whether subsumption of inline view or subqueries would be valid. In an embodiment, the flowchart 100 of FIG. 1 may be the basis of the subsumption conditions check. For example, based on the flowchart 100, both original queries Q1A and Q2A contain multiple inline views or subqueries, which pass the validity check.

If it is determined, at step 304, that the subsumption conditions check fails, then the flowchart ends at step 314. Otherwise, the flowchart continues to step 306, where the inline views or subqueries are replaced with a subsuming view.

The subsuming view contains the tables and join conditions of the subsumed views or subqueries. The subsuming view also contains a CASE statement for each SELECT item of each subsumed inline view or subquery. Each CASE statement encapsulates the WHERE clause filter predicates as well as the SELECT item aggregation function in the SELECT item corresponding to that CASE statement. Factorization and unification techniques are employed, if applicable, for placement of filter predicates that appear in the inline views or subqueries. For example, the subsumed inline views or subqueries in original queries Q1A and Q2A are replaced with subsuming views in rewritten queries Q1B and Q2B.

At step 308, it is determined whether grouping passes a grouping and pre-computation heuristic check. The determination made at step 308 indicates that the benefit of grouping outweighs the cost associated with this operation. In an embodiment, the flowchart 200 of FIG. 2 may be the basis of the grouping and pre-computation heuristic check. For example, based on the flowchart 200, rewritten query Q2B passes the grouping and pre-computation heuristic check.

If it is determined, at step 308, that the grouping and pre-computation heuristic check fails, then a resulting query is executed at step 312. Otherwise, the flowchart continues to step 310, where a new group-by view is created in the subsuming view.

The group-by view includes the tables, joins, and filter predicates of the subsuming view, and a GROUP BY clause containing the column(s) referenced in the filter predicates of CASE statement WHEN clauses of the subsuming view. One or more aggregations may be included in the group-by view such that these aggregations are pre-computed. For example, rewritten query Q2B is optimized as query Q2C, which includes a group-by view in which common aggregates are to be pre-computed.

At step 312, the resulting query is executed. The resulting query may be from step 306 or step 310.

The resulting query that is executed by DBMS, after performing inline view and subquery subsumption as described herein, may be further transformed by the DBMS prior to execution.

Database Overview

Embodiments of the present invention are used in the context of DBMSs. Therefore, a description of an example DBMS is provided.

Generally, a server, such as database server instance, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database, such as database, comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Query Optimization and Execution Plans

Query optimization generates one or more different candidate execution plans for a query, which are evaluated by the query optimizer (such as query optimizer) to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e., one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

Hardware Overview

Database may reside in volatile and/or non-volatile storage, including persistent storage or flash memory, or volatile memory of computing device. Additionally, or alternatively, database may be stored, at least in part, in main memory of a database server computing device.

One or more of the functions attributed to any process described herein, may be performed any other logical entity, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
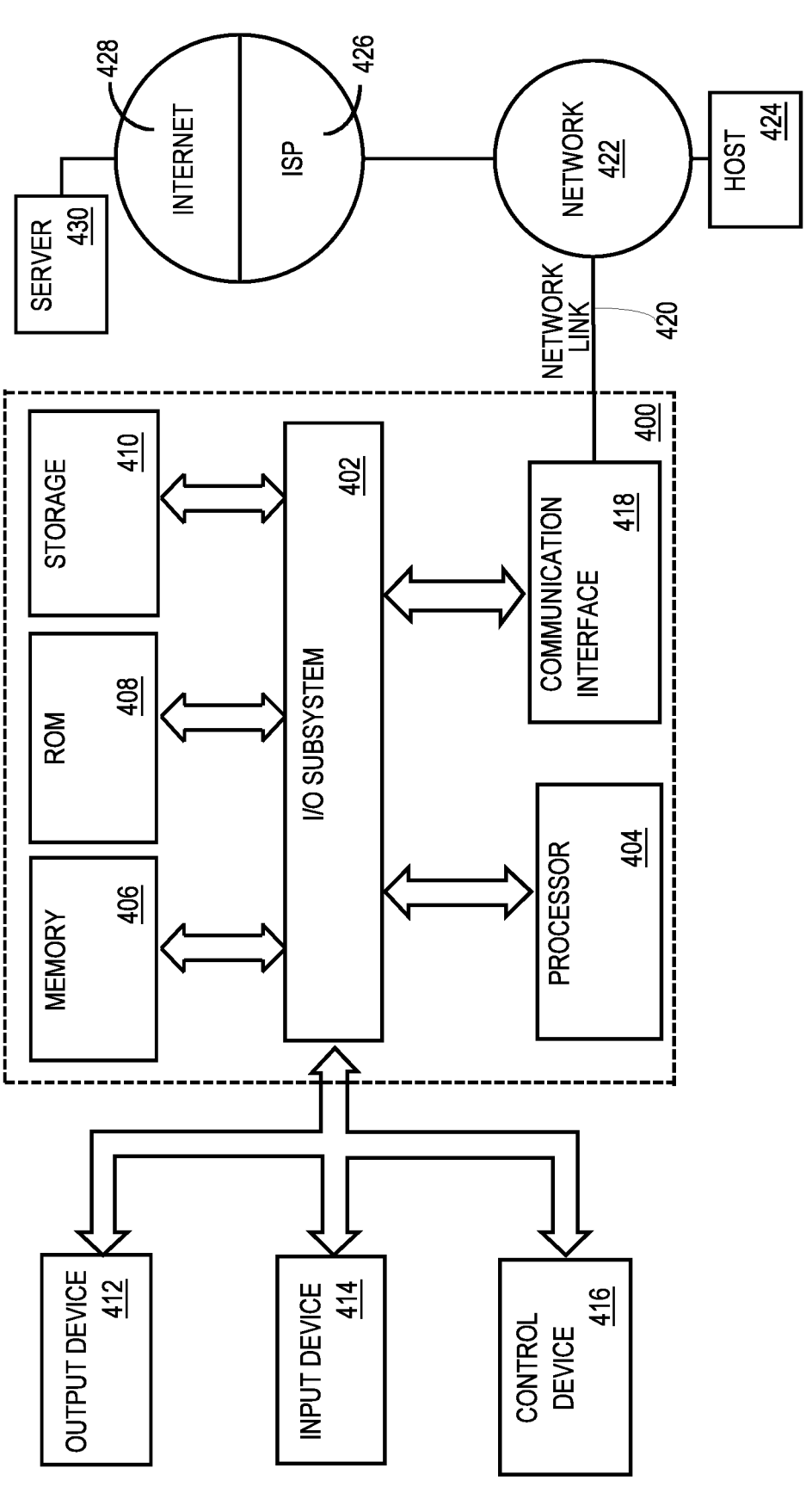
FIG. 4 is a block diagram that illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
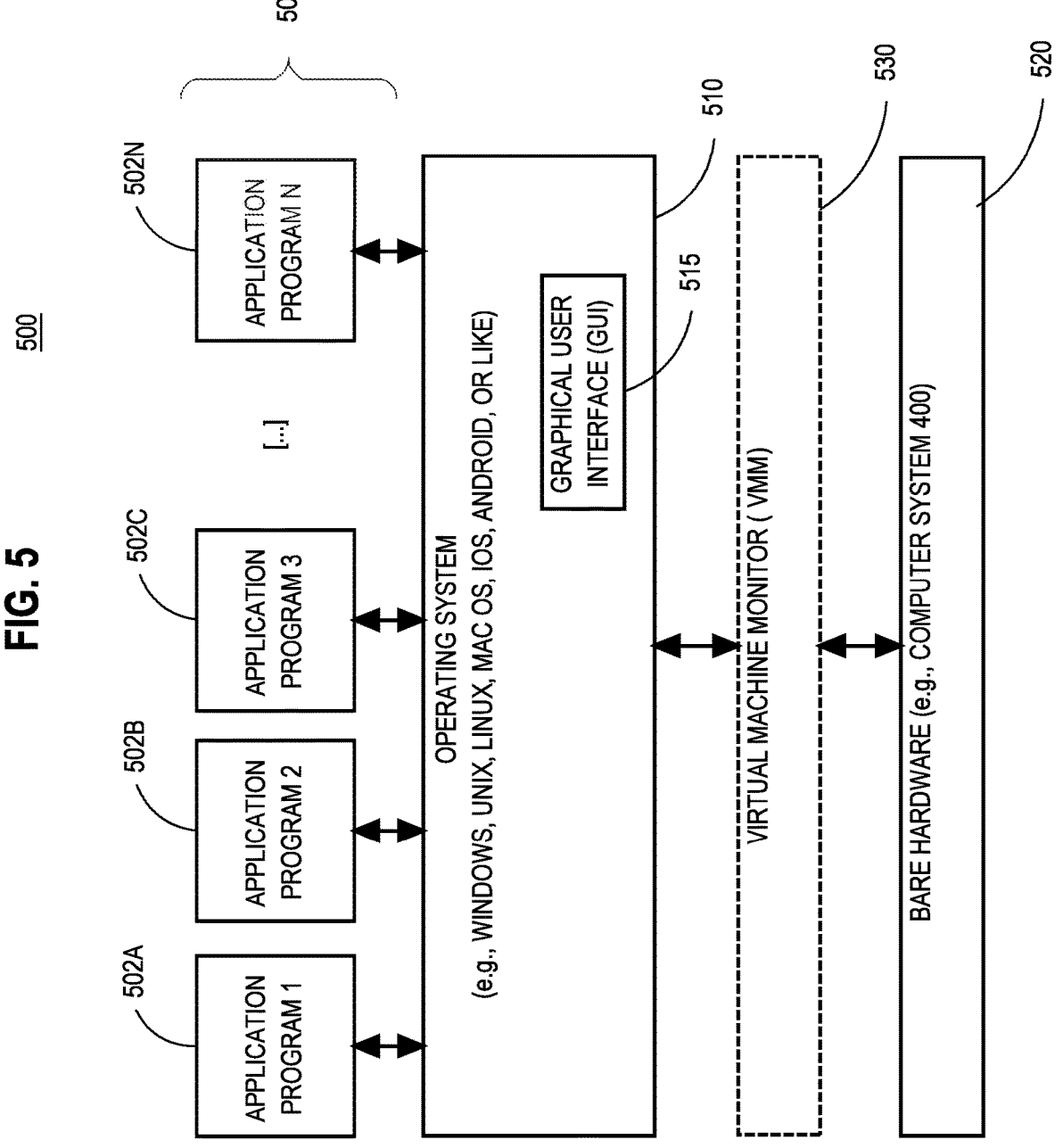
FIG. 5 is a block diagram of a basic software system that may be employed for controlling the operation of a computer system.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method, comprising:
   a database management system transforming a query to produce a transformed query;
   wherein the query includes an outer query block, the outer query block includes a plurality of inner query blocks, each inner query block of the plurality of inner query blocks being a subquery or inline view of the outer query block and including a SELECT clause and a FROM clause;

wherein the plurality of inner query blocks is in a FROM clause or a SELECT clause of the outer query block, each inner query block of said plurality of inner query blocks returning only one row;

wherein the transforming the query comprises:
  determining, by the database management system, that the outer query block satisfies subsumption conditions, wherein the determining that the outer query block satisfies the subsumption conditions comprises:
    determining that each of the plurality of inner query blocks includes aggregation functions and no GROUP BY clauses;
    determining that the plurality of inner query blocks reference identical tables and includes one or more identical join conditions;
  in response to the database management system determining that the outer query block satisfies the subsumption conditions, performing removal of the plurality of inner query blocks,
  wherein the performing removal of the plurality of inner query blocks comprises replacing the plurality of inner query blocks with a subsuming view, said subsuming view including a SELECT clause, a FROM clause, wherein the replacing the plurality of inner query blocks with the subsuming view further comprises:
    removing a common filter predicate from the plurality of inner query blocks and adding the common filter predicate in a WHERE clause of the subsuming view;
    combining similar filter predicates from the plurality of inner query blocks into a disjunctive predicate or range filter predicate in the subsuming view; and
    placing the one or more join conditions within said subsuming view; and
  executing the transformed query;
  wherein the method is performed by one or more computing devices.

2. The method of claim 1, wherein the replacing the plurality of inner query blocks with the subsuming view comprises:
  replacing an aggregation function within a particular inner query block, of the plurality of inner query blocks with a subsuming view,
  wherein the particular inner query block includes a particular SELECT clause,
  wherein the subsuming view includes in a SELECT clause a CASE statement as an argument for the aggregation function, wherein the CASE statement includes a condition based on a non-factorized filter predicate.

3. The method of claim 1, wherein the transforming the query further comprises in response to the database management system determining that the subsuming view satisfies optimization criteria, performing grouping and precomputation of aggregation functions in a group-by view.

4. The method of claim 3, wherein said optimization criteria comprises:
  said grouping reduces a number of rows produced by the group-by view by at least a first predetermined amount;
  said grouping reduces aggregation functions by at least a second predetermined amount of reduction.

5. The method of claim 4, wherein said subsuming view includes a set of CASE statements, wherein the optimization criteria further comprises:
  determining that the subsuming view refers to a single table;
  determining that the subsuming view includes unified filter predicates in a WHERE clauses in the subsuming view;
  determining that there are at most two columns that appear in a WHEN clause of each CASE statement of said set of CASE statements.

6. The method of claim 3, wherein the performing grouping and precomputation of aggregation functions comprises:
  creating the group-by view in the subsuming view;
  wherein the group-by view contains tables, join conditions, and filter predicates of the subsuming view;
  wherein a GROUP BY clause of the group-by view contains a single column referenced in a CASE statement in the subsuming view.

7. The method of claim 3, wherein the subsuming view includes a set of aggregation functions including AVG aggregation functions, wherein each AVG aggregation function of the set of aggregation functions is replaced with a SUM aggregation function and a COUNT aggregation function.

8. One or more non-transitory computer-readable media storing one or more sequences of instructions that, when executed by one or more processors, cause:
  a database management system transforming a query to produce a transformed query;
  wherein the query includes an outer query block, the outer query block includes a plurality of inner query blocks, each inner query block of the plurality of inner query blocks being a subquery or inline view of the outer query block and including a SELECT clause and a FROM clause;
  wherein the plurality of inner query blocks is in a FROM clause or a SELECT clause of the outer query block, each inner query block of said plurality of inner query blocks returning only one row;
  wherein the transforming the query comprises:
    determining, by the database management system, that the outer query block satisfies subsumption conditions, wherein the determining that the outer query block satisfies the subsumption conditions comprises:
      determining that each of the plurality of inner query blocks includes aggregation functions and no GROUP BY clauses;
      determining that the plurality of inner query blocks reference identical tables and includes one or more identical join conditions;
    in response to the database management system determining that the outer query block satisfies the subsumption conditions, performing removal of the plurality of inner query blocks,
    wherein the performing removal of the plurality of inner query blocks comprises replacing the plurality of inner query blocks with a subsuming view, wherein the replacing the plurality of inner query blocks with the subsuming view further comprises:
      removing a common filter predicate from the plurality of inner query blocks and adding the common filter predicate in a WHERE clause of the subsuming view;

combining similar filter predicates from the plurality of inner query blocks into a disjunctive predicate or range filter predicate in the subsuming view; and placing the one or more join conditions within said subsuming view; and executing the transformed query.

9. The one or more non-transitory computer-readable media of claim 8, wherein the replacing the plurality of inner query blocks with the subsuming view comprises:

replacing an aggregation function within a particular inner query block, of the plurality of inner query blocks with a subsuming view, wherein the particular inner query block includes a particular SELECT clause, wherein the subsuming view includes in a SELECT clause a CASE statement as an argument for the aggregation function, wherein the CASE statement includes a condition based on a non-factorized filter predicate.

10. The one or more non-transitory computer-readable media of claim 8, wherein the transforming the query further comprises in response to the database management system determining that the subsuming view satisfies optimization criteria, performing grouping and pre-computation of aggregation functions in a group-by view.

11. The one or more non-transitory computer-readable media of claim 10, wherein said optimization criteria comprises:

said grouping reduces a number of rows produced by the group-by view by at least a first predetermined amount;

said grouping reduces aggregation functions by at least a second predetermined amount of reduction.

12. The one or more non-transitory computer-readable media of claim 11, wherein said subsuming view includes a set of CASE statements, wherein the optimization criteria further comprises:

determining that the subsuming view refers to a single table;

determining that the subsuming view includes unified filter predicates in a WHERE clauses in the subsuming view;

determining that there are at most two columns that appear in a WHEN clause of each CASE statement of said set of CASE statements.

13. The one or more non-transitory computer-readable media of claim 10, wherein the performing grouping and precomputation of aggregation functions comprises:

creating the group-by view in the subsuming view;

wherein the group-by view contains tables, join conditions, and filter predicates of the subsuming view;

wherein a GROUP BY clause of the group-by view contains a single column referenced in a CASE statement in the subsuming view.

14. The one or more non-transitory computer-readable media of claim 10, wherein the subsuming view includes a set of aggregation functions including AVG aggregation functions, wherein each AVG aggregation function of the set of aggregation functions is replaced with a SUM aggregation function and a COUNT aggregation function.

* * * * *